(12) United States Patent
Johnson (10) Patent No.: US 8,237,722 B2
(45) Date of Patent: Aug. 7, 2012

(54) SYSTEMS AND METHOD FOR VISUALIZATION OF FLUIDS

(75) Inventor: Jesse Johnson, Weymouth, MA (US)

(73) Assignee: Take Two Interactive Software, Inc., New York, NY (US)

( * ) Notice: Subject to any disclaimer, the term of this patent is extended or adjusted under 35 U.S.C. 154(b) by 897 days.

(21) Appl. No.: 12/195,377

(22) Filed: Aug. 20, 2008

(65) Prior Publication Data

US 2010/0045669 A1 Feb. 25, 2010

(51) Int. Cl.
*G06T 15/00* (2011.01)
(52) U.S. Cl. ............... 345/522; 345/473; 703/2; 703/6; 703/9
(58) Field of Classification Search .............. 345/422, 345/473, 474, 475; 703/2, 6, 9
See application file for complete search history.

(56) References Cited

U.S. PATENT DOCUMENTS 5,877,777 A * 3/1999 Colwell .................. 345/473
7,983,884 B2 * 7/2011 Anderson ................. 703/9

OTHER PUBLICATIONS

Eden et al, A Method for Cartoon-style Rendering of Liquid Animations, Proceedings of Graphics Interface 2007, ACM, May 2007, pp. 51-55.*

* cited by examiner

*Primary Examiner* — Phu K Nguyen
(74) *Attorney, Agent, or Firm* — Kenyon & Kenyon LLP (57) ABSTRACT

Methods and systems for simulating and visualizing a flowing fluid when interacting with an intersecting object are provided. The simulating of falling fluid as a two-dimensional plan and rendering first and second depth buffers corresponding to current depth information for, respectively, a top surface and a bottom surface of an object is rendered. The values of first and second current simulation textures are rendered for the top and bottom surfaces of the object, where for a given frame each of the first and second current simulation texture values is set to either a corresponding value of the first and second current simulation texture values is set to either a corresponding value of each or second depth buffer or a corresponding, velocity-offset value of the previous frame's first or second simulation texture respectively. A visible fluid mesh is rendered in the two-dimensional plane based on the current simulation textures.

26 Claims, 9 Drawing Sheets

SYSTEMS AND METHOD FOR VISUALIZATION OF FLUIDS

FIELD OF THE INVENTION

The present disclosure relates generally to simulation and visualization of fluids using three-dimensional computer graphics and, more particularly, to systems and methods that facilitate visualization of fluids using three-dimensional computer graphics.

BACKGROUND

Manufacturers of video games attempt to inject as much realism as possible into a game. For example, an interaction between an object and a flowing fluid may be wished to be shown as realistically as possible to enhance a game player's gaming experience. Presently, existing methods do not appear to show a realistic interaction with a flowing fluid, and instead such depictions appear either avoided or shown in an unrealistic manner. Accordingly, there is a need for a method to show realistic interaction with flowing fluids within the computing resources and timing available.

DETAILED DESCRIPTION

Example embodiments of the present invention involve methods and systems to simulate and visualize a flowing, e.g., falling, fluid when interacting with an intersecting object.

An example embodiment provides for simulating the falling fluid as a two-dimensional plane and rendering a first one-dimensional depth buffer and a second one-dimensional depth buffer, where the first and second depth buffers correspond to current depth information for, respectively, a top surface and a bottom surface of the object in relation to an upper edge of the two-dimensional plane. These depth buffers provide one-dimensional "snapshots" of the intersection of the top and bottom surfaces, respectively, of the object, which may be one or more of a plurality of objects intersecting the fluid. In locations where there is no intersection, i.e., in locations along the top edge that do not intersect the object when the top edge is projected in the two-dimensional plane in the flow direction, the buffer values may both be set the bottom of the two-dimensional plane. A further embodiment provides for rendering values of a first current simulation texture for the top surface of the object, where for a given frame each of the first current simulation texture values is set to either a corresponding value of the first depth buffer or a corresponding, velocity-offset value of the previous frame's first simulation texture. A further embodiment provides for rendering values of a second current simulation texture for the bottom surface of the object, where for the given frame each of the second current simulation texture values is set to either a corresponding value of the second depth buffer or a corresponding, velocity-offset value of a previous frame's second simulation texture. According to the example embodiment, a visible fluid mesh is rendered in the two-dimensional plane based on the current simulation textures. Splash effects may be rendered in locations that correspond to at least one of the simulation textures, e.g., the first simulation texture.

The simulation textures may be rendered so as to reflect a movement or change in position resulting from a velocity, e.g., due to the simulated force of gravity. In contrast to the depth buffer values, which may, e.g., move from a position on the upper or lower surface of the object immediately to the bottom of the two-dimensional plane, the simulation textures allow for more gradual transitions. Because the fluid mesh and/or splash effects are rendered based on the simulation textures rather than the depth buffers, they allow for a visualization that appears more natural and may reduce or eliminate any unwanted "popping" in or out of pixels.

Example procedures according to example embodiments of the invention may provide techniques very similar to one-dimensional shadow mapping. In this manner, each falling fluid, e.g., waterfall, may be a two-dimensional plane. A one-dimensional depth map may be rendered from the top of each falling fluid looking downward using all of the objects affecting the falling fluid. When rendering the fluid itself, each point on the falling fluid may be rendered into the local space of its corresponding one-dimensional shadow map. While this may be accomplished by simply clipping pixels at points on the falling fluid that are farther from the top of the falling fluid than the depth map sample, such tends to cause a visual effect(s) of "popping in" and/or "popping out," where the fluid seems to appear and/or disappear from one frame to the next, rather than appearing to fall downwardly in a realistic manner. This may be remedied by providing a second one-dimensional depth map for a bottom surface of the object and providing simulation textures based on the two depth maps according to example embodiments of the present invention.

Figure 1A:
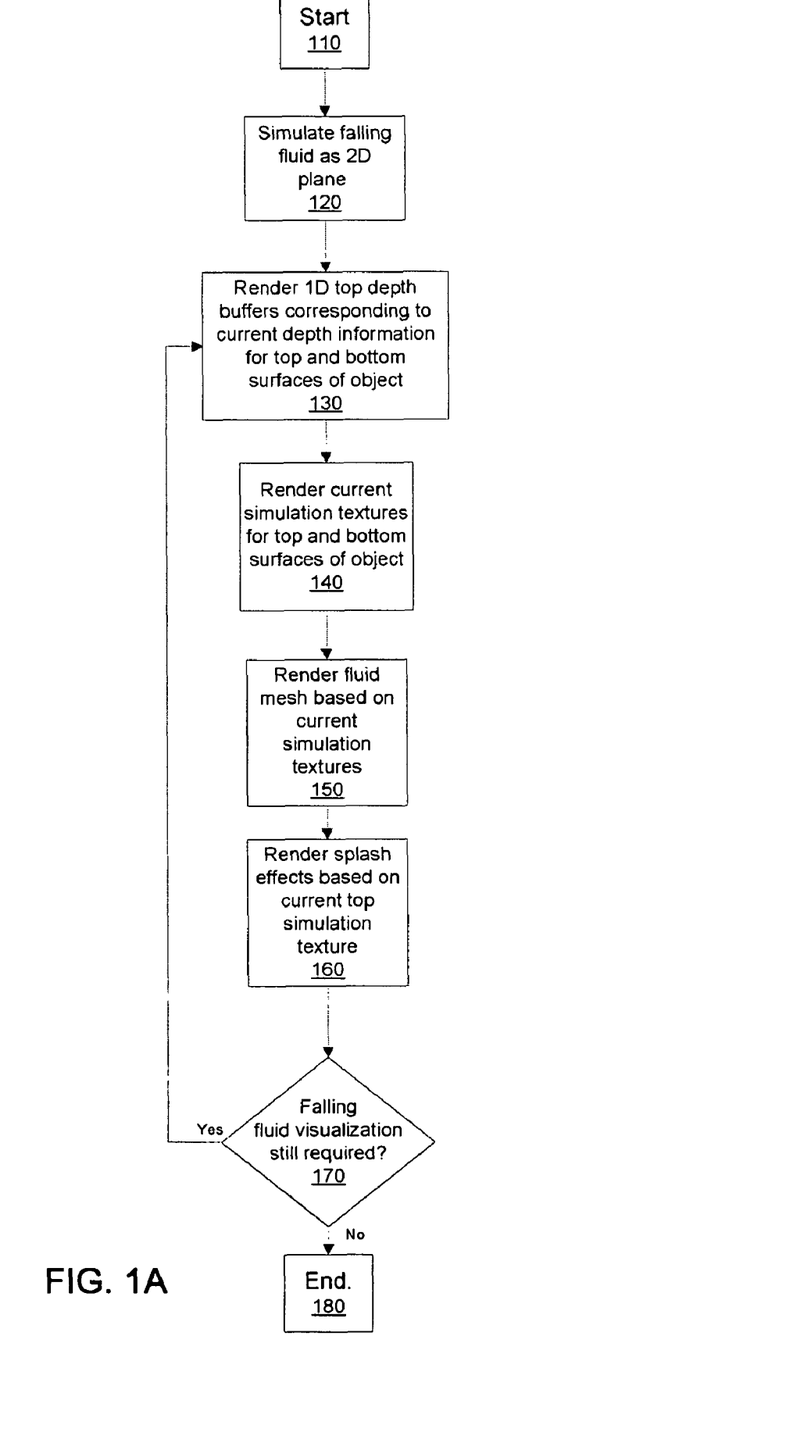
FIG. 1A shows a flowchart illustrating an example embodiment of the present invention.

FIG. 1A is an example procedure of how an example embodiment of the present invention works. The procedure is initiated at 110. At 120, a falling fluid is simulated as a two-dimensional plane, e.g., a rectangular plane. The two-dimensional plane corresponds to the general location where the falling fluid will be visualized.

At 130, one-dimensional depth buffers are rendered with respect to the top edge of the two-dimensional plane. The depth buffers correspond to current depth information for top and bottom surfaces of an object that may intersect the two-dimensional plane, i.e., the plane of the simulated fluid. The depth buffer may include a set of depths at predetermined locations, e.g., equally spaced apart, along the width of the upper edge of the two-dimensional plane. The depth values of the depth buffers correspond to distances from the upper edge of the two-dimensional plane to the upper or lower surface of the object at the intersection between the upper or lower surface of the object and the two-dimensional plane. In the absence of any such intersection at a given location along the width of the top surface, the depth buffer value for that location is set to the bottom edge of the two-dimensional plane.

Both of the one-dimensional depth buffers, i.e., "snapshots," are taken from the point of view of the top of the waterfall looking down. The first buffer may be rendered using a clockwise cull mode to record the depth of the top of the intersecting object or objects, and the second buffer may be rendered using a counter-clockwise cull mode to record the depth of the underside of the intersecting object or objects. A z-function of less than or equal may be used for both buffers, although this may not be necessary for the underside. In the absence of any object intersecting the falling fluid, i.e., the two-dimensional plane, the buffers both remain set to the bottom. The instant an object goes from intersecting the falling fluid to not intersecting the falling fluid, these textures or buffers will also be reset to the bottom. These buffers are used to capture current depth information.

At 140, current top and bottom simulation textures are rendered with respect to the top and bottom surfaces. The top simulation texture and the bottom simulation texture set upper and lower boundaries, respectively, of a region where the falling fluid should not be visualized within the two-dimensional plane. For a given frame, each of the top simulation texture value and the bottom simulation texture value may be set to either the respective depth buffer value or a value that reflects the effect of downward motion, e.g., motion due to gravity. The rendering of the top and bottom current simulation textures is described in further detail below with respect to FIGS. 1B and 1C.

At 150, a fluid mesh is rendered based on the top and bottom current simulation textures. In this regard, the fluid mesh, which provides a visualization of the falling fluid, is mapped to the two-dimensional plane such that the fluid mesh is not rendered, and is thus not visible, in the space between the top current simulation texture and the bottom current simulation texture. The rendering of the fluid mesh is described in further detail below with respect to FIG. 1D.

At 160, splash effects may be rendered to add further realism to the visualization. In the absence of an intersection between the two-dimensional plane and an object the splash effects at a given location are visualized at the bottom edge of the two-dimensional texture that represents the bottom edge of the falling fluid. The splash effects thus visualize the fluid splashing as it falls into contact with a lower surface, e.g., a floor. At locations where an object intersects the falling fluid, the splash texture is visualized at the location of the intersection between the two-dimensional plane and the top surface of the object. The rendering of the splash effects is described in further detail below with regard to FIG. 1E.

At 170, it is determined whether visualization of the falling fluid is still required, i.e., whether the next sequential frame requires visualization of the falling fluid. If so, the process reverts to 130 such that the depth buffers are again rendered with regard to the depth information for the next frame. In this manner, the procedure updates the depth buffers so as to be current for each frame in which the falling fluid is simulated and visualized. The procedure at 130, 140, 150, 160, and 170 is iterated until visualization of the falling fluid is no longer required, in which case the procedure ends at 180. It should be appreciated that the depth buffers may be rendered at intervals other than every frame, e.g., every other frame. Any process described herein may be altered to occur at intervals other than every frame, e.g., where it is desired to limit the demand on system resources.

It should be further appreciated that the shape, size, and/or location of the two-dimensional plane may be dynamic or static. For example, it may be desired to simulate and visualize a volume of falling fluid that increases between successive frames. If, e.g., the fluid is falling from a circular opening, e.g., a pipe, the height and width of the two-dimensional plane would increase accordingly. Thus, the two-dimensional plane may be dynamically changed for a given frame to allow this effect. Similarly, the size, texture, and/or shape of the splash effects may be dynamically altered to realistically reflect changes in the volume and/or velocity of the flow.

Figure 1B:
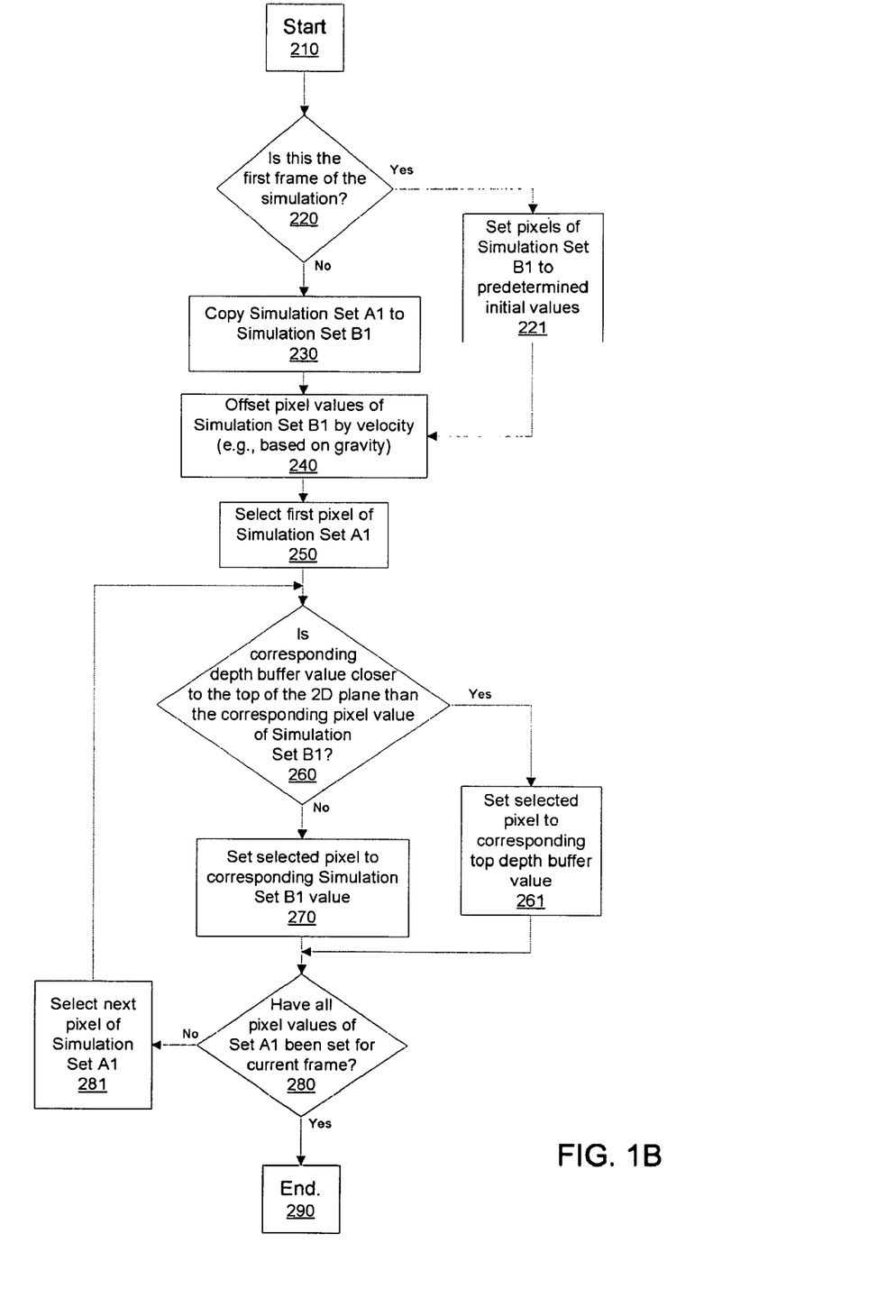
FIG. 1B shows a flowchart illustrating an example procedure to determine the current top simulation texture in accordance with the example embodiment shown in FIG. 1A.
Figure 1C:
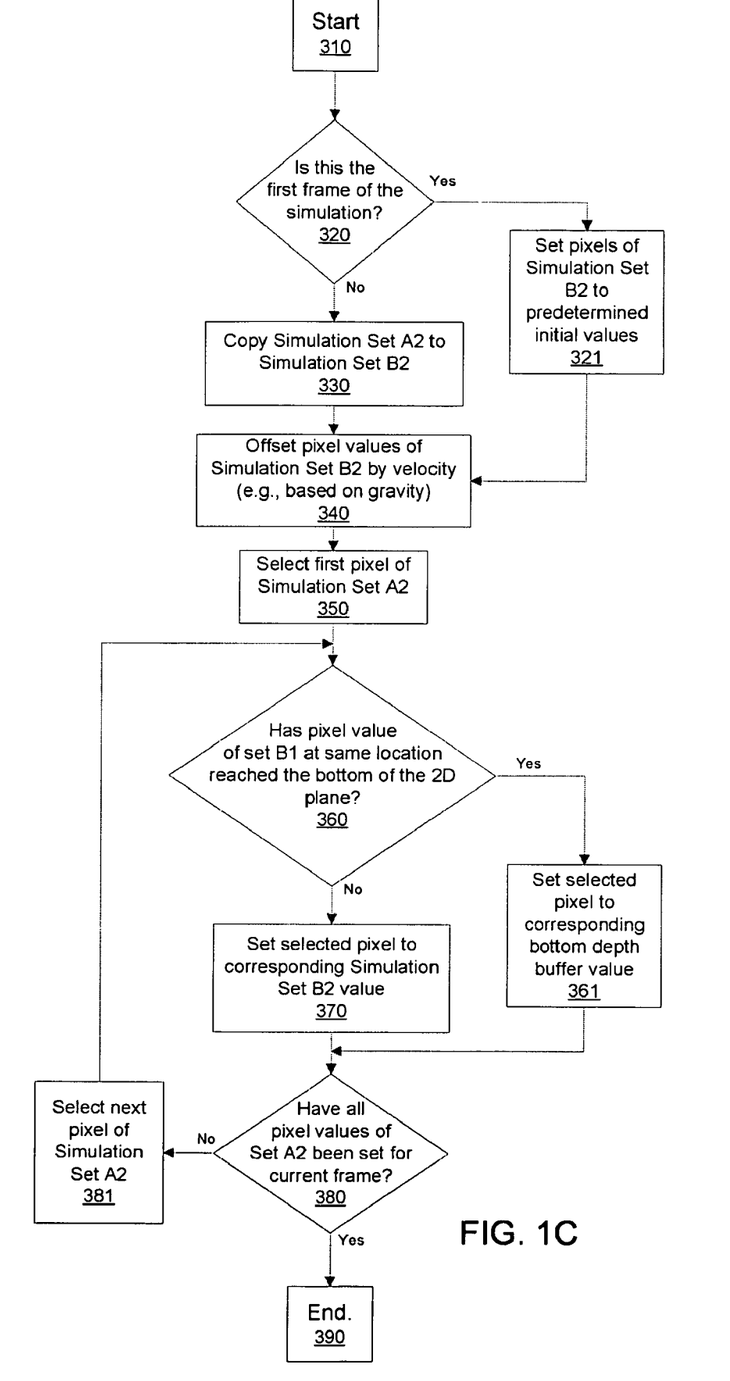
FIG. 1C shows a flowchart illustrating an example procedure to determine the current bottom simulation texture in accordance with the example embodiment shown in FIG. 1A.

FIGS. 1B and 1C are example procedures to determine the current top and bottom simulation textures within the procedure of FIG. 1A at 140.

The procedure of FIG. 1B, which is initiated at 210, provides for rendering of the current top simulation texture. At 220, it is determined if the current frame is the first frame of the simulation. If so, the pixels of a simulation set B1 are set to initial values, e.g., predetermined initial values, at 221. Since simulation set B1 generally corresponds to the previous top simulation texture, e.g., the top simulation texture from the previous frame, the simulation set B1 needs to be assigned an initial value during the first frame. If the present frame is not the first frame of the simulation, a simulation set A1, i.e., the current top simulation texture, is copied to simulation set B1 at 230. Since, at this point, the simulation set A1 has not yet been updated to reflect the current frame information, the copying of simulation set A1 to simulation set B1 in effect sets simulation set B1 to the previous top simulation texture.

At 240, the pixel values of the simulation set B1 are offset by the velocity of the falling fluid. The velocity may be, e.g., a constant velocity chosen to approximate the effect of gravity. If additional realism is desired, an acceleration component may be incorporated; however, this may increase complexity and utilize more system resources than having a set velocity. In this manner, the previous top simulation texture is offset to account for the velocity (and/or acceleration if desired) of the falling fluid. This gives an indication of where the pixels of the previous simulation set should be currently located if allowed to freely fall during the time lapsed between the previous frame and the current frame.

At 250, a first pixel of simulation set A1 is selected. At 260, in the location of the selected pixel of simulation set A1, the depth buffer value (rendered at 130 in FIG. 1A) for the top surface is compared to a corresponding pixel value, i.e., the value of the pixel of simulation set B1 that is located at the same lateral position along the first or top edge of the two-dimensional plane. In this regard, the depth buffer value, the pixel value of simulation set A1, and the corresponding pixel value of simulation set B1 all relate to positions along a line that is parallel to the flow direction. This line corresponds to a given location along the top edge of the two-dimensional plane. The pixel values may be stored, e.g., as a distance in the flow direction from the top edge of the two-dimensional plane. If the depth buffer value is closer to the top of the two-dimensional plane than the corresponding pixel value of simulation set B1, the selected pixel of simulation set A1 is set to the corresponding depth buffer value at 261, i.e., the depth buffer value for the top surface of the object in the same location along the top edge of the two-dimensional plane. If not, the selected pixel of simulation set A1 is set to the corresponding pixel value of simulation set B1.

At 280, if all of the pixels of simulation set A1 have not been set for the current frame, the next unset pixel of simulation set A1 is selected at 281 and the comparison and setting process is repeated for the next pixel location. Once it is determined at 280 that all of the pixel values of simulation set A1 have been set, the process ends at 290 for the given frame. In this manner, the simulation set A1, i.e., the current top simulation texture, is set for the current frame.

The procedure of FIG. 1C, which is initiated at 310, provides for rendering of the current bottom simulation texture. At 320, it is determined if the current frame is the first frame of the simulation. If so, the pixels of a simulation set B2 are set to initial values, e.g., predetermined initial values, at 321. Simulation set B2 generally corresponds to the previous bottom simulation texture, e.g., the bottom simulation texture from the previous frame. Thus, the simulation set B2 needs to be assigned an initial value during the first frame. If the present frame is not the first frame of the simulation, a simulation set A2, i.e., the current bottom simulation texture, is copied to simulation set B2 at 330. Since, at this point, the simulation set A2 has not yet been updated to reflect the current frame information, the copying of simulation set A2 to simulation set B2 in effect sets simulation set B2 to the previous bottom simulation texture.

At 340, the pixel values of the simulation set B2 are offset by the velocity of the falling fluid. The velocity may be, e.g., a constant velocity chosen to approximate the effect of gravity. If additional realism is desired, an acceleration component may be incorporated; however, this may increase complexity and utilize more system resources than having a set velocity. Moreover, the velocity may be the same or different than the velocity used for offsetting the values of simulation set B1. In this manner, the previous top simulation texture is offset to account for the velocity (and/or acceleration if desired) of the falling fluid. This gives an indication of where the pixels of the previous simulation set should be currently located if allowed to freely fall during the time lapsed between the previous frame and the current frame.

At 350, a first pixel of simulation set A2 is selected. At 360, it is determined whether the corresponding pixel value of simulation set B1, i.e., the previous frame's top simulation texture, has reached the bottom of the two-dimensional depth. If so, the selected pixel of simulation set A2 is set to the depth buffer value for the bottom surface of the object at 361. If not, the selected pixel value is set to the corresponding value of simulation set B2 at 370. In this regard, the depth buffer value, the pixel value of simulation set A2, the pixel value of simulation set B2, and the corresponding pixel value of simulation set B1 all relate to positions along a line that is parallel to the flow direction. This line corresponds to a given location along the top edge of the two-dimensional plane. The pixel values may be stored, e.g., as a distance in the flow direction from the top edge of the two-dimensional plane.

At 380, if all of the pixels of simulation set A2 have not been set for the current frame, the next unset pixel of simulation set A2 is selected at 381 and the setting process is repeated for the next pixel location. Once it is determined at 380 that all of the pixel values of simulation set A2 have been set, the process ends at 390 for the given frame. In this manner, the simulation set A2, i.e., the current bottom simulation texture, is set for the current frame.

The range of values for simulation set A2 may be set or clamped to a range between the top and the bottom of the two-dimensional plane. This can be automatically implemented with certain types of textures. In an embodiment, for textures that do not provide for clamping, one may wish to clamp the values explicitly to avoid potential issues where the magnitudes of the numbers get too large to be effectively stored.

It should be appreciated that the procedure of FIG. 1C may be performed before, after, and/or during the procedure of FIG. 1B.

Figure 1D:
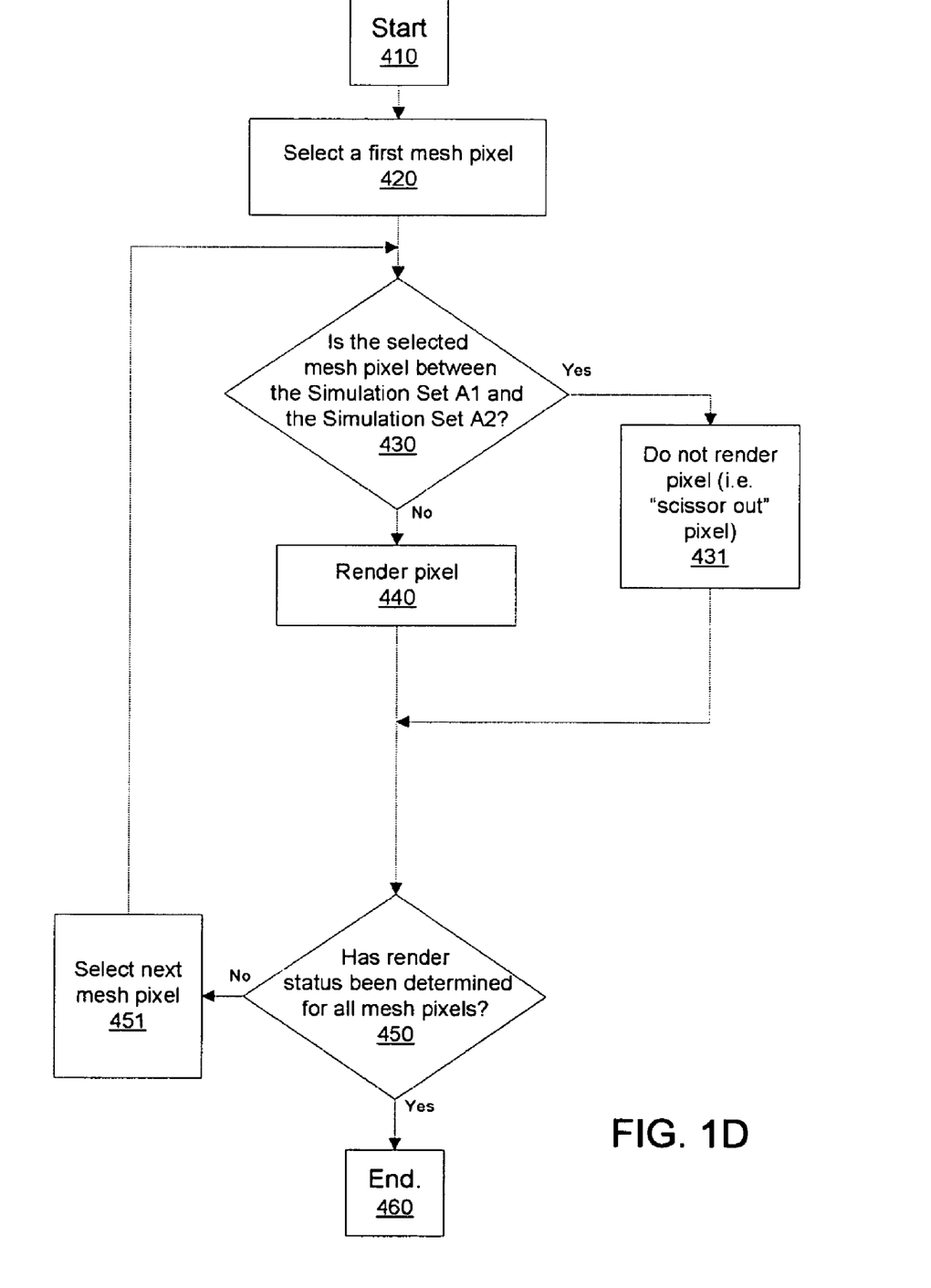
FIG. 1D shows a flowchart illustrating an example procedure to render the fluid mesh based on current simulation textures in accordance with the example embodiment shown in FIG. 1A.

FIG. 1D is an example procedure to render the fluid mesh based on current simulation textures in accordance with the embodiment of FIG. 1A at 150. The procedure of FIG. 1D, which is initiated at 410, involves selecting a first mesh pixel at 420. At 430, it is determined whether the selected mesh pixel, when mapped to the two-dimensional plane, falls between the simulation set A1, i.e., the current top simulation texture, and the simulation set A2, i.e., the current bottom simulation texture. If so, the selected pixel is not rendered at 431 and is therefore not visible in the visualization of the falling fluid. If the selected mesh pixel does not fall between the simulation set A1 and the simulation set A2, the selected mesh pixel is rendered at 440, and is therefore visible in the visualization of the falling fluid.

At 450, it is determined whether the render status has been determined for all of the mesh pixels. If not, the next mesh pixel is selected at 451 and the render status is set in the same manner as for the prior pixel. Once it is determined that the render status has been set for all of the mesh pixels for the current frame, the procedure of FIG. 1D ends at 460.

Figure 1E:
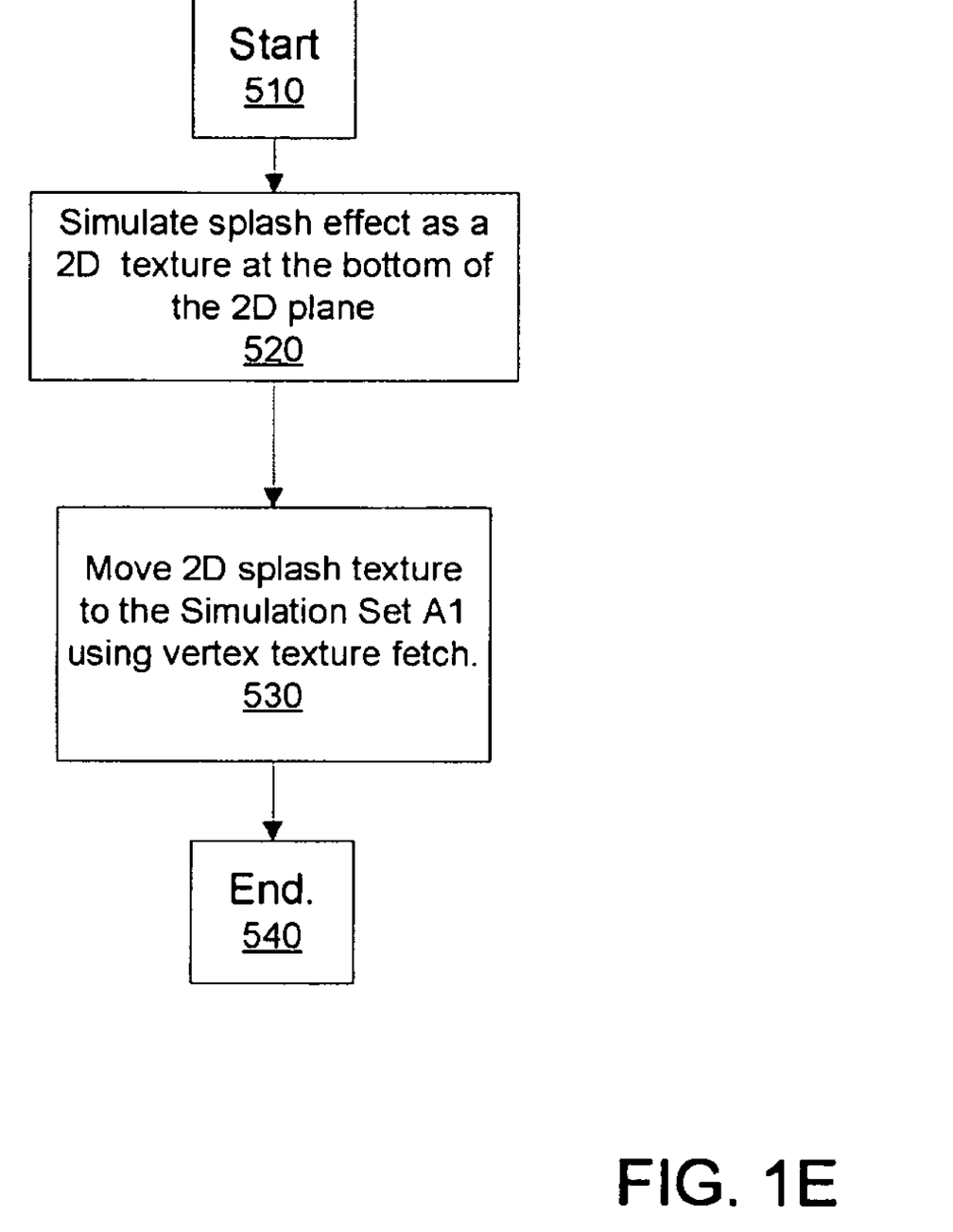
FIG. 1E shows a flowchart illustrating an example procedure to render splash effects based on the current top simulation texture in accordance with the example embodiment shown in FIG. 1A.

FIG. 1E is an example procedure to render splash effects based on current top simulation texture in accordance with the embodiment of FIG. 1A at 160. The procedure of FIG. 1E is initiated at 510. At 520, a splash effect is simulated as a two-dimensional texture at the bottom of the 2d plane. The splash effect, which may be one of a plurality of splash effects along the plane, may be rectangular or any other appropriate shape. Upon the object intersecting the two-dimensional plane simulating the falling fluid, the two-dimensional splash texture or particle is moved to the location, i.e., depth, of simulation set A1 using a vertex texture fetch at 530. The procedure of FIG. 1E ends for the current frame at 540.

Regarding the vertex texture fetch at 530, in an embodiment, the two-dimensional texture's constant, original spawned location is used in the vertex fetch lookup. This allows for a single lateral location along the top edge of the two-dimensional plane to be used when looking up the position of the current simulation value. If, for example, the splash texture has four vertices, each of those vertices does a lookup into the first current simulation set corresponding to the lateral location of the original spawned location of the splash texture. In other words, the lookup for each of the vertices is determined by going to the single, constant lateral location along the width (e.g., along the top edge) of the two-dimensional simulation plane corresponding to the original spawn location and looking up the value of the current, upper surface simulation set value corresponding to that single location. This allows all of the vertices of a given splash texture to be displaced vertically (e.g., upwardly offset) by the same value. Further, this results in the constraint of the splash texture in a constant lateral position along the two-dimensional plane simulating the falling fluid. This may prevent skewing, popping, and/or other unwanted artifacts. For example, if the texture fetch used the current position of each texture for each respective lookup, the texture may be skewed where, e.g., some of the vertices are set to values at the bottom of the plane while others are set to the top of the intersecting object. As another example, if the lateral location of the lookup is allowed to shift along the width of the two dimensional plane, the lookup may cause the texture to "pop" to the bottom of the plane when the lookup location moves along the contour of the simulation set from a current simulation set value at the top of the object to an adjacent current simulation set value at the bottom of the two-dimensional plane.

In a further embodiment, the lookup for each of the vertices is determined by going to the single, constant lateral location along the width (e.g., along the top edge) of the two-dimensional simulation plane corresponding to the original spawn location and looking up the value of the current, upper surface simulation set value corresponding to that single location for essentially the lifetime of a particle.

Although the above procedures have been described as simulating and visualizing a falling fluid, it should be appreciated that these procedures or analogous procedures may be provided for simulation and visualization of fluids that are not falling or flowing downwardly, e.g., a fluid that is flowing sideways or upwardly.

Figure 2:
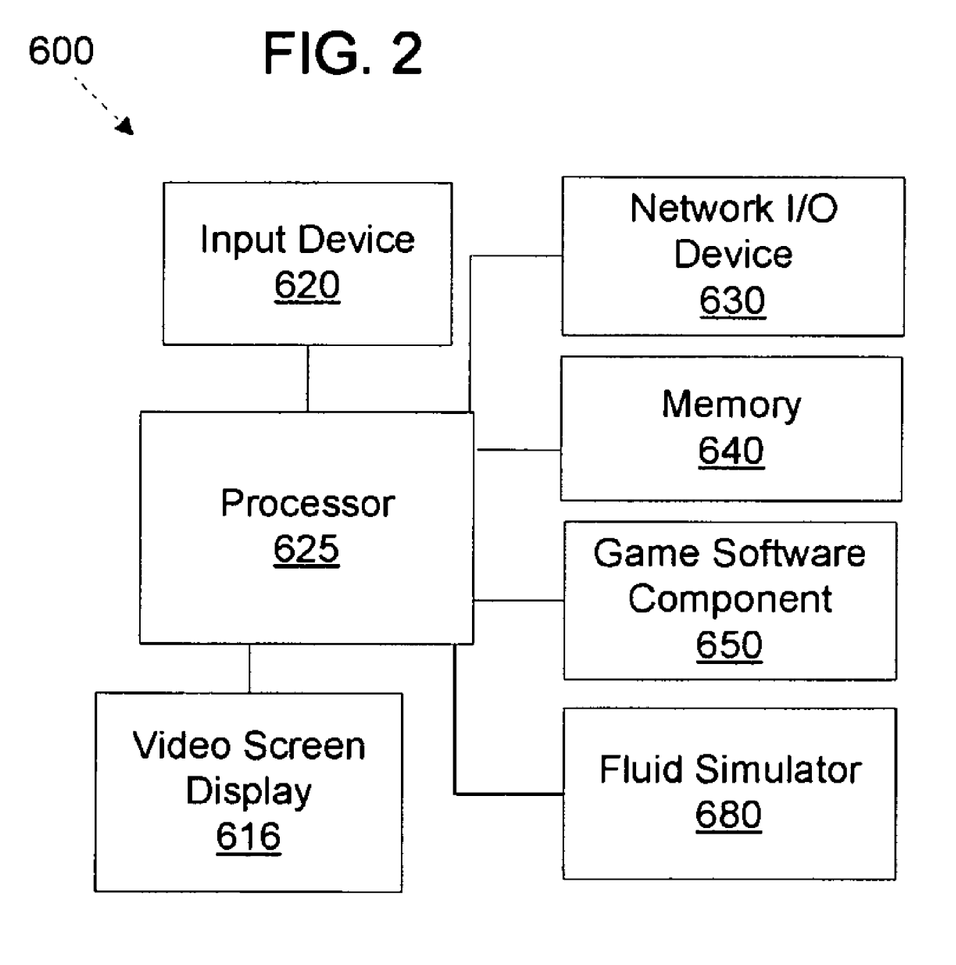
FIG. 2 shows an example system which may run an example procedure of the present invention.

FIG. 2 illustrates an example system which runs an example procedure of an example embodiment of the present invention. Example system 600 has a processor 625, which may be in communication with various peripherals, e.g., input device 620 or network I/O device 630. The system 600 may be, for example, a PC and the input device 620 may for example be a keyboard and/or mouse. The system 600 may be a game console and the input device 620 may be a game controller. The system 600 may have or be in communication with a video display 616. The system 600 may interface with the video display 616 through a graphics card. The video display 616 may be built into the system such as in a mobile game system or a cellular phone. The video display 616 may alternatively be connected to the system via a wire or wirelessly such as a PC or television based gaming console. System 600 may have a memory 640, which may be RAM, a disk-drive, a CD or DVD, ROM, flash drive, any other type of memory, or any combination of available types of memory. The system 600 may have a game software component 650. The game software component may be stored in memory 640. As part of the game software component 640 or separately the system may have a fluid simulator 680. The system may also have a Graphics Processing Unit. Processor 625 may be a GPU, the GPU may be in addition to processor 625, or the GPU may be located on the graphics card which may be in communication with processor 625.

Figure 3A:
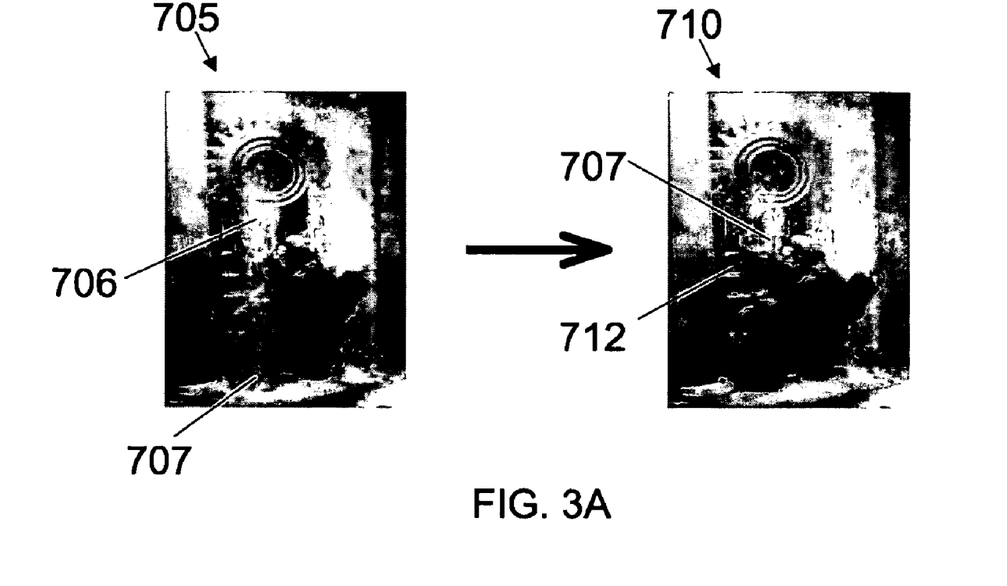
FIGS. 3A and 3B show example visualizations illustrating the effect of not including simulation textures and a lower surface depth buffer of an example embodiment of the present invention.
Figure 3B:
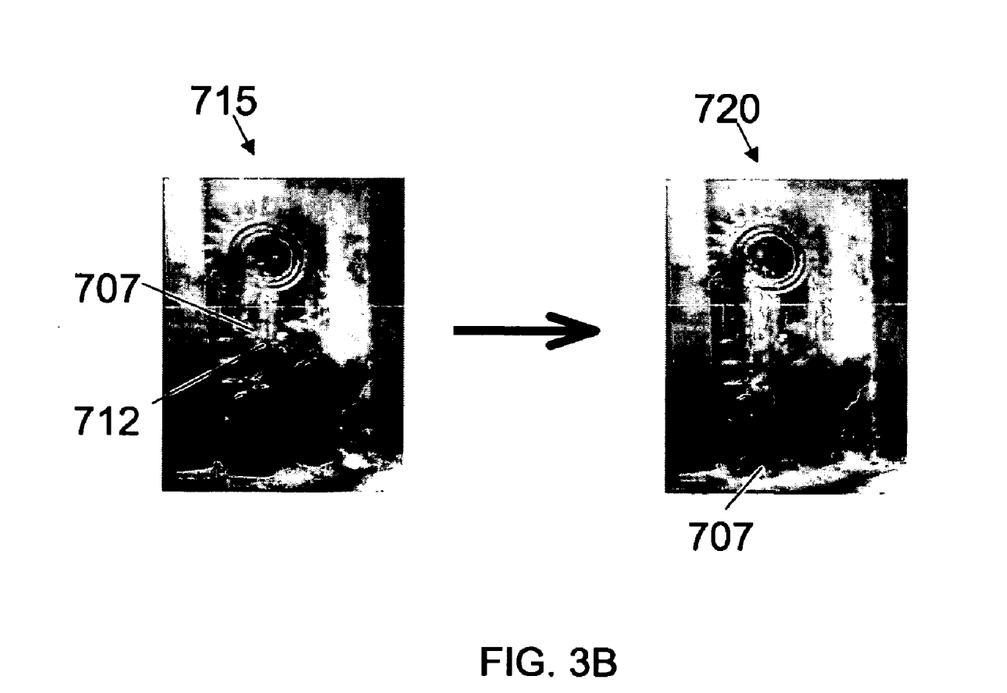

FIGS. 3A and 3B illustrate the effect of omitting the simulation textures and the bottom surface depth buffer from example procedures according to example embodiments of the present invention. Without the simulation textures or depth buffer for the bottom surfaces of objects, the procedure is set so that the mesh is not rendered (and thus not visualized) in locations below the depth texture for the top surfaces of objects. FIG. 3A shows a first frame 705 with a simulated and visualized falling fluid 706 and splash effects 707. As per frame 705, the splash effects are being rendered at the bottom of the two-dimensional plane simulating the falling fluid 706. Since simulation textures are not used, the splash texture is set to the top surface depth buffer instead of the top simulation texture. In frame 705, all of the pixel values in the top surface depth buffer are set to the bottom of the two-dimensional plane. Thus, the splash effects are being rendered at the bottom of the two-dimensional plane.

As the current frame transitions from frame 705 to a next sequential frame 710, an object 710, in this case a character's arm, intersects the two-dimensional plane simulating the falling fluid. At this instant, the top surface depth buffer pixel values are set to the top surface of the intersecting object 710 such that the fluid mesh is not rendered anywhere below the top surface of the object 710. Likewise, the splash effects 707 have in this instant, moved from the bottom of the two-dimensional plane to the top surface of the object in order to track the top surface depth buffer values. The instantaneous disappearance of a large portion of the fluid mesh leads to a "popping-out" effect that tends to appear noticeably unnatural and unrealistic.

Referring to FIG. 3B, a similar effect, "popping-in," occurs in the instant that the object 710 no longer intersects the falling fluid. In this regard, when the current frame transitions from frame 715 to the next sequential frame 720, the top surface depth buffer values are moved from the top surface of the object 710 to the bottom of the two-dimensional plane simulating the falling fluid 706. As such, the entire region below the top surface of the object 710 and the bottom of the two-dimensional plane is instantly rendered with the fluid mesh, and the splash effects instantly move from the top surface of the object 710 and the bottom of the two-dimensional plane of the falling fluid. As with the popping-out effect, a popping-in effect appears unnatural and unrealistic.

Figure 3C:
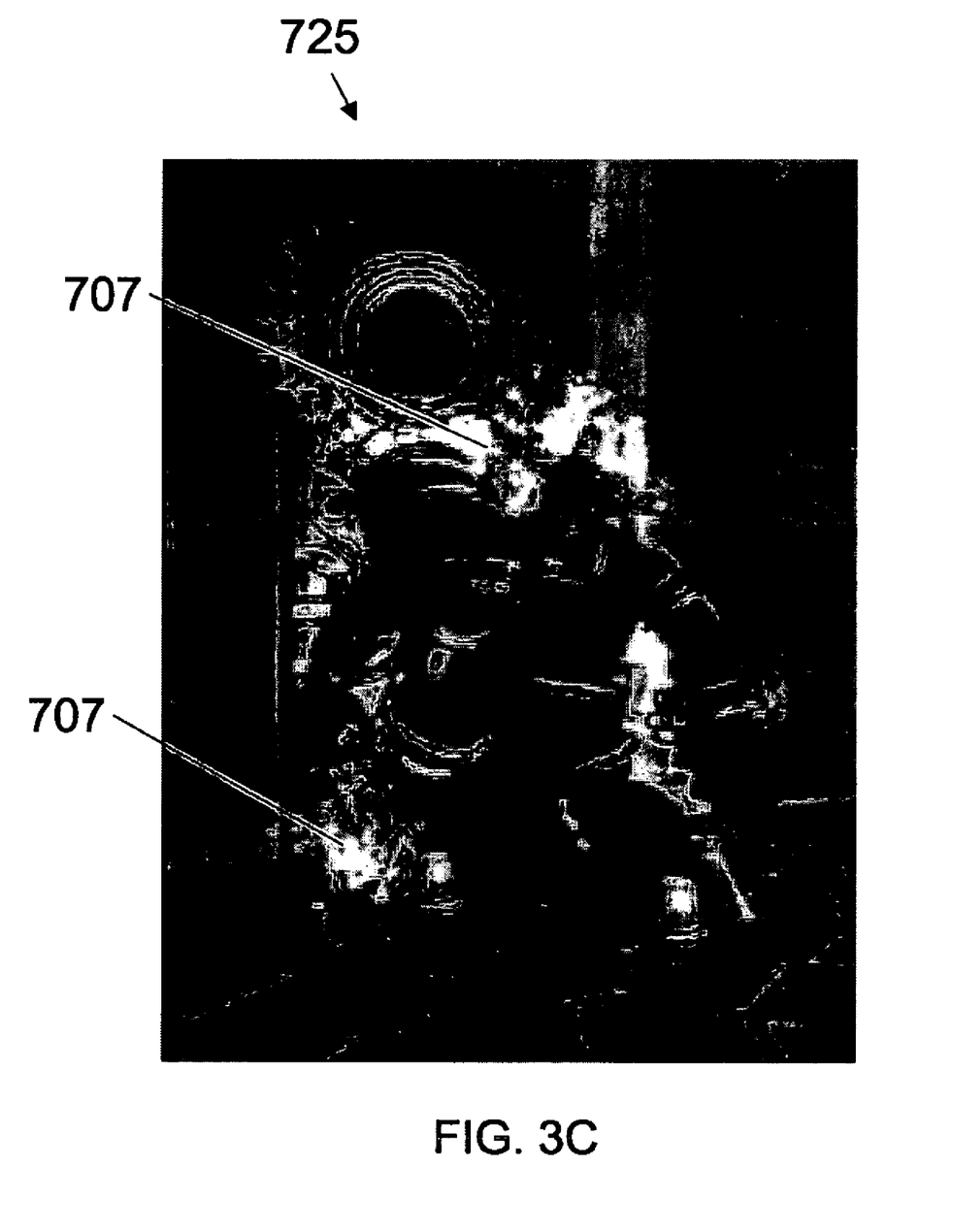
FIG. 3C shows an example visualization of a fluid flow and splash effects according to an example embodiment of the present invention.

FIG. 3C illustrates the effect of adding the simulation textures. The frame 725 is rendered at a point after the object 710 has moved out the two-dimensional plane simulating the falling fluid. Since the top simulation texture is adjusted incrementally between frames to account for falling velocity of the fluid, the splash effects 707 appear to fall naturally, as if being pulled downwardly by gravity. As illustrated in frame 725, some of the pixel values of top surface depth buffer are set to the bottom (in areas of no intersection), while others are set to the top surface of the character (where intersecting).

The simulation textures and the bottom surface depth buffer in the embodiments described herein provide that any perceived popping in and out to be minimized and/or even effectively eliminated. At the instant (i.e., in the particular frame) an object intersects the plane of the flowing fluid, the top surface buffer is set to the top surface of the object and the bottom surface buffer is set to the bottom surface of the object. Accordingly, in an embodiment, the mesh is rendered so that the area between the upper surface of the object and the bottom surface of the object is not rendered. If in subsequent frames, the object remains in an intersecting position, in an embodiment, the lower surface depth buffer is incrementally moved toward the bottom edge of the two-dimensional plane by setting each frame's current bottom simulation texture to the previous frame's bottom simulation texture, offset by a velocity chosen to approximate the effect of gravity. In this manner, a realistic visualization of an intersected flow may be achieved. Similarly, when the object moves out of the plane of the flowing fluid, the current top simulation texture is incrementally moved toward the bottom edge of the two-dimensional plane by setting each frame's current top simulation texture to the previous frame's top simulation texture, offset by a velocity chosen to approximate the effect of gravity.

Figure 4:
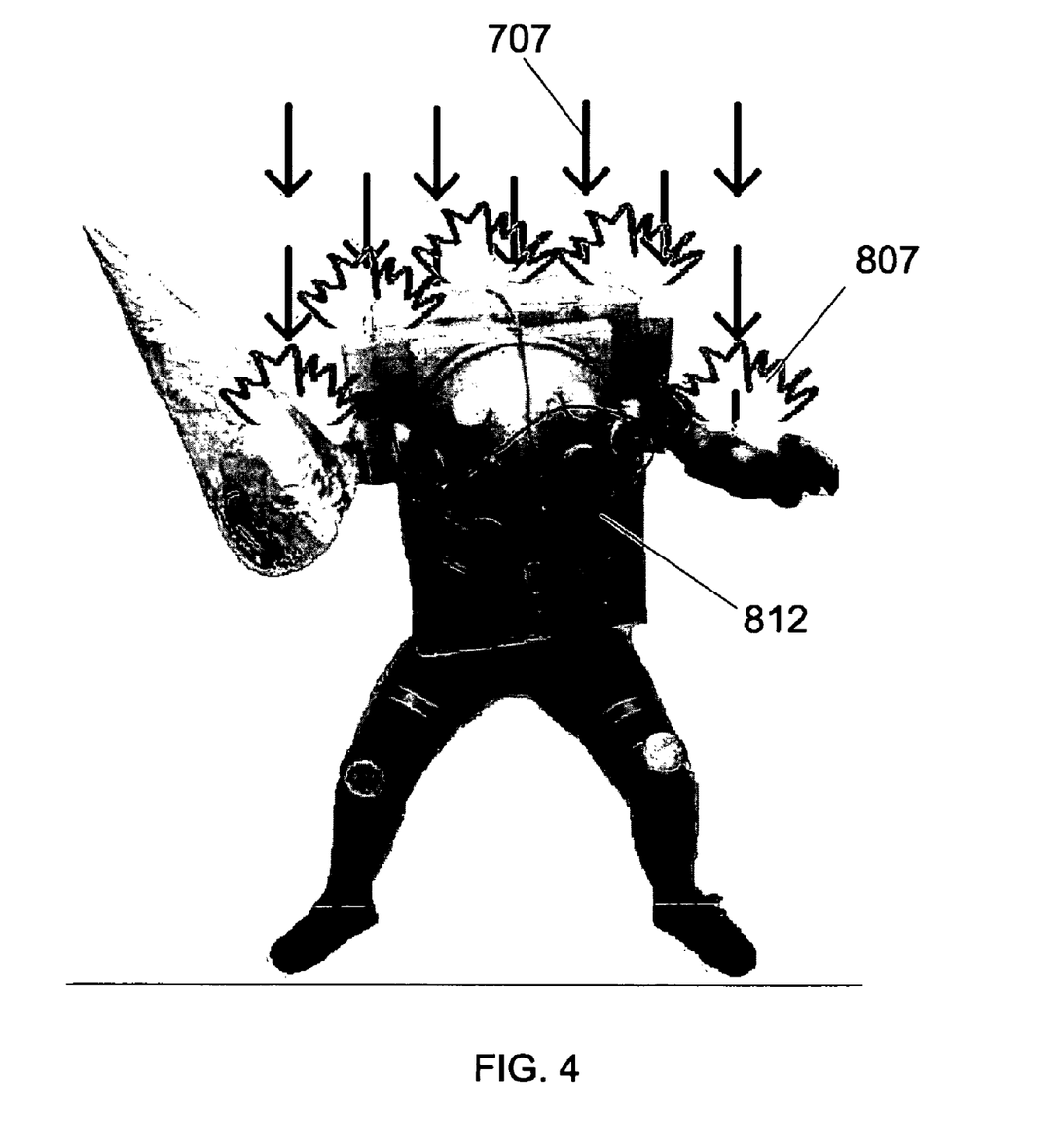
FIG. 4 shows an example visualization of a fluid flow and splash effects according to an example embodiment of the present invention.

FIG. 4 illustrates an example visualized fluid flow 707 and splash effects 807 at the top surface of an object 812 intersecting the two-dimensional plane simulating the flow 707. This gives the impression that the fluid is interacting and splashing off of the top surface of the object 812.

It should be understood that there exist implementations of other variations and modifications of the invention and its various aspects, as may be readily apparent to those of ordinary skill in the art, and that the invention is not limited by specific embodiments described herein. Features and embodiments described above may be combined in various ways. The present invention is therefore contemplated to cover any and all modifications, variations, combinations or equivalents that fall within the scope of the basic underlying principals disclosed and claimed herein.

It will be appreciated that all of the disclosed methods, and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods, and procedures.

What is claimed is:

1. A method for simulating and visualizing an interaction between an object and a falling fluid, comprising:
    simulating the falling fluid as a two-dimensional plane;
    rendering a first one-dimensional depth buffer and a second one-dimensional depth buffer, the first and second depth buffers corresponding to current depth information for, respectively, a top surface and a bottom surface of the object;
    rendering values of a first current simulation texture for the top surface of the object, wherein for a given frame each of the first current simulation texture values is set to one of: a corresponding value of the first depth buffer and a corresponding, velocity-offset value of the previous frame's first simulation texture;
    rendering values of a second current simulation texture for the bottom surface of the object, wherein for the given frame each of the second current simulation texture values is set to one of: a corresponding value of the second depth buffer and a corresponding, velocity-offset value of a previous frame's second simulation texture; and
    rendering a visible fluid mesh in the two-dimensional plane based on the current simulation textures.

2. The method of claim 1, further comprising:
    rendering a splash texture at the location of the first current simulation texture.

3. The method of claim 2, further comprising:
    moving the splash texture from a position at the bottom of the two-dimensional plane to a position on the upper surface of the object.

4. The method claim 2, wherein the splash texture is positioned by a vertex texture fetch.

5. The method of claim 1, wherein the depth information for the top surface and the bottom surface is in relation to a top edge of the two-dimensional plane.

6. The method of claim 1, wherein the fluid mesh is not rendered at any location between the first simulation texture and the second simulation texture.

7. The method of claim 1, wherein the velocity used to offset the values of the previous frame's first and second simulation textures approximates the effect of gravity.

8. The method of claim 1, wherein the rendering of the first current simulation texture values includes determining which of (a) the corresponding value of the first depth buffer and (b) the corresponding, velocity-offset value of the previous frame's first simulation texture is closer to the top of the two-dimensional plane.

9. The method of claim 8, wherein the rendering of the first current simulation texture values further includes setting each of the first current simulation texture values to whichever of (a) the corresponding value of the first depth buffer and (b) the corresponding, velocity-offset value of the previous frame's first simulation texture is determined to be closer to the top of the two-dimensional plane.

10. The method of claim 1, wherein the rendering of the second current simulation texture values includes determining whether the previous frame's corresponding first simulation texture value has reached the bottom of the two-dimensional plane.

11. The method of claim 10, wherein the rendering of the second current simulation texture values further includes setting each of the second current simulation texture values to one of: (a) the corresponding value of the first depth buffer if the previous frame's corresponding first simulation texture value has reached the bottom of the two-dimensional plane and (b) the corresponding, velocity-offset value of the previous frame's second simulation texture if the previous frame's corresponding first simulation texture value has not reached the bottom of the two-dimensional plane.

12. The method of claim 1, wherein the rendering of the visible fluid mesh includes determining which pixels of the fluid mesh would fall between the first current simulation texture and the second current simulation texture when the fluid mesh is mapped to the two-dimensional plane.

13. The method of claim 12, wherein the rendering of the visible fluid mesh further includes rendering only the pixels of the fluid mesh that are not determined to fall between the first current simulation texture and the second current simulation texture.

14. A computer-readable storage medium encoded with instructions configured to be executed by a processor, the instructions which, when executed by the processor, cause the performance of a method for simulating and visualizing an interaction between an object and a falling fluid, comprising:
    simulating the falling fluid as a two-dimensional plane;
    rendering a first one-dimensional depth buffer and a second one-dimensional depth buffer, the first and second depth buffers corresponding to current depth information for, respectively, a top surface and a bottom surface of the object in relation to an upper edge of the two-dimensional plane;
    rendering values of a first current simulation texture for the top surface of the object, wherein for a given frame each of the first current simulation texture values is set to either a corresponding value of the first depth buffer or a corresponding, velocity-offset value of a previous frame's first simulation texture;
    rendering values of a second current simulation texture for the bottom surface of the object, wherein for the given frame each of the second current simulation texture values is set to either a corresponding value of the second depth buffer or a corresponding, velocity-offset value of the previous frame's second simulation texture; and
    rendering a visible fluid mesh in the two-dimensional plane based on the current simulation textures.

15. A system for simulating and visualizing an interaction between an object and a falling fluid, comprising:
    a processor in communication with a memory;
    the memory being configured to store a data structure representing a two-dimensional surface, first and second one-dimensional depth buffers, and first and second one-dimensional current simulation textures;
    the processor being configured to simulate the falling fluid as a two-dimensional plane;
    the processor being configured to render the first one-dimensional depth buffer and the second one-dimensional depth buffer to correspond to current depth information for, respectively, a top surface and a bottom surface of the object in relation to an upper edge of the two-dimensional plane;
    the processor being configured to render values of the first current simulation texture for the top surface of the object, wherein for a given frame each of the first current simulation texture values is set to either a corresponding value of the first depth buffer or a corresponding, velocity-offset value of a previous frame's first simulation texture;

the processor being configured to render values of the second current simulation texture for the bottom surface of the object, wherein for the given frame each of the second current simulation texture values is set to either a corresponding value of the second depth buffer or a corresponding, velocity-offset value of the previous frame's second simulation texture; and the processor being configured to render a visible fluid mesh in the two-dimensional plane based on the current simulation textures.

16. The system of claim 15, wherein the processor is a Graphics Processing Unit (GPU).

17. The system of claim 16, wherein the rendering of the first current simulation texture and the rendering of the second current simulation texture occurs at least to some degree in parallel on the processor.

18. A method for simulating and visualizing an interaction between an object and a falling fluid, comprising:

simulating the falling fluid as a two-dimensional plane;

rendering a splash texture at the bottom of the two-dimensional plane; and moving the splash texture to an upper surface of the object intersecting the two-dimensional plane.

19. The method of claim 18, wherein the splash texture is positioned by a vertex texture fetch.

20. The method of claim 19, wherein a lookup value for the vertex texture fetch is set to a location at which the splash effect was originally spawned.

21. The method of claim 18, further comprising:

rendering a one-dimensional depth buffer corresponding to current depth information for a top surface of the object in relation to an upper edge of the two-dimensional plane;

rendering values of a current simulation texture for the top surface of the object, wherein for a given frame each of the current simulation texture values is set to either a corresponding value of the first depth buffer or a corresponding, velocity-offset value of the previous frame's simulation texture; and moving the splash texture to the location of the current simulation texture.

22. A system for simulating and visualizing an interaction between an object and a falling fluid, comprising:

a processor in communication with a memory;

the memory being configured to store a data structure representing a two-dimensional surface, and a splash texture;

the processor being configured to simulate the falling fluid as a two-dimensional plane;

the processor being configured to render the splash texture at the bottom of the two-dimensional plane; and the processor being configured to move the splash texture to an upper surface of the object intersecting the two-dimensional plane.

23. The system of claim 22, wherein the processor is a Graphics Processing Unit (GPU).

24. The system of claim 22, wherein processor is configured to position the splash texture using a vertex texture fetch.

25. The system of claim 24, wherein the processor is configured to set a lookup value for the vertex texture fetch to a location at which the splash effect was originally spawned.

26. The system of claim 22, wherein:

the memory is further configured to store a data structure representing a one-dimensional depth buffer, and a one-dimensional current simulation texture;

the processor is configured to render the one-dimensional depth buffer to correspond to current depth information for a top surface of the object in relation to an upper edge of the two-dimensional plane;

the processor is configured to render values of a current simulation texture for the top surface of the object, wherein for a given frame each of the current simulation texture values is set to either a corresponding value of the first depth buffer or a corresponding, velocity-offset value of the previous frame's simulation texture; and the processor is configured to move the splash texture to the location of the current simulation texture.

* * * * *